United States Patent [19]
Tenbusch, II

[11] Patent Number: 5,482,404
[45] Date of Patent: Jan. 9, 1996

[54] UNDERGROUND PIPE REPLACEMENT TECHNIQUE

[76] Inventor: Albert A. Tenbusch, II, 2206 Marble Falls, Carrollton, Tex. 75007

[21] Appl. No.: 98,454

[22] Filed: Jul. 27, 1993

[51] Int. Cl.⁶ .................. F16L 1/00; F16L 55/18
[52] U.S. Cl. .................. 405/184; 405/154; 405/156; 138/47
[58] Field of Search .................. 405/154, 156, 405/184, 157; 254/29 R; 138/97

[56] References Cited

U.S. PATENT DOCUMENTS

| | | | |
|---|---|---|---|
| 3,362,167 | 1/1968 | Ward | 405/282 |
| 3,708,984 | 1/1973 | Coleman | 405/184 X |
| 3,791,151 | 2/1974 | Plank | 405/282 |
| 4,091,630 | 5/1978 | Nemoto et al. | 405/184 |
| 4,507,019 | 3/1985 | Thompson | 405/154 |
| 4,576,515 | 3/1986 | Morimoto et al. | 405/184 |
| 4,626,134 | 12/1986 | Coumont | 405/184 |
| 4,634,313 | 1/1987 | Robbins | 405/184 |
| 4,637,756 | 1/1987 | Boles | 405/184 |
| 4,674,914 | 6/1987 | Waymane et al. | 405/154 |
| 4,720,211 | 1/1988 | Streatfield et al. | 405/154 |
| 4,738,565 | 4/1988 | Streatfield, et al. | 405/154 |
| 4,789,268 | 12/1988 | Yarnell | 405/154 |
| 4,830,539 | 5/1989 | Akesaka | 405/184 |
| 4,848,964 | 7/1989 | Yarnell | 405/154 |
| 4,886,396 | 12/1989 | Akesaka | 405/184 |
| 4,915,543 | 4/1990 | Akesaka | 405/156 |
| 4,925,344 | 5/1990 | Peres et al. | 405/184 |
| 4,930,542 | 6/1990 | Winkle et al. | 138/98 |
| 4,944,634 | 7/1990 | Alexander et al. | 405/184 |
| 4,958,959 | 9/1990 | St. Onge | 405/184 |
| 4,983,071 | 1/9991 | Fisk et al. | 405/154 |
| 5,048,793 | 9/1991 | Mefford et al. | 405/184 X |
| 5,069,426 | 12/1991 | Gabrysch | 405/184 X |
| 5,076,731 | 12/1991 | Luksch | 405/154 |
| 5,112,158 | 5/1992 | McConnell | 405/154 |
| 5,125,768 | 6/1992 | Ilomaki | 405/184 X |
| 5,171,106 | 12/1992 | Rockower et al. | 405/184 X |
| 5,173,009 | 12/1992 | Moriarty | 405/184 X |
| 5,205,671 | 4/1993 | Handford | 405/154 |
| 5,211,509 | 5/1993 | Roessler | 405/184 |
| 5,282,696 | 2/1994 | Solomon et al. | 405/184 |
| 5,306,101 | 4/1994 | Rockower et al. | 405/184 X |

FOREIGN PATENT DOCUMENTS

| | | | |
|---|---|---|---|
| 0060124 | 9/1982 | European Pat. Off. | 405/184 |
| 2213904 | 8/1989 | United Kingdom | 405/184 |

OTHER PUBLICATIONS

"No–Dig™ Microtunneling and Slip–Lining Pipe" brochure, Division of MCP Industries, Inc., Mar., 1993.
TRS Publication–Description of Operations (1987).
TRS Publication–Fast, Low–Cost Non–Disruptive Trenchless Pipeline Replacement (undated).
TRS Publication–TRS LC–25 Laterals Replacement Machine (1987).
TRS Publication–TRS–Applications.
PIM Publication–Cost Effective Pipeline Replacement Systems from PIM Corporation (1988).

*Primary Examiner*—Dennis L. Taylor
*Attorney, Agent, or Firm*—Richards, Medlock & Andrews

[57] ABSTRACT

The apparatus and technique of the invention constitutes a stationary hydraulic jack for pushing sections of new pipe which, in turn, push a frontal cone expander to break up the old pipe and define a path for the new pipe. Frontal apparatus located in front of the new pipe and pushed thereby can include a hydraulic jack for independently advancing the cone expander without operating the stationary hydraulic jack.

28 Claims, 5 Drawing Sheets

UNDERGROUND PIPE REPLACEMENT TECHNIQUE

TECHNICAL FIELD OF THE INVENTION

The present invention relates in general to apparatus for the replacement of deteriorated underground pipes, and more particularly methods and apparatus for breaking up the old underground pipes and forcing new pipes through the path of the broken pipeline.

BACKGROUND OF THE INVENTION

Virtually every city in the United States, as well as in foreign countries, has sanitary drainage systems and sewage disposal systems. A vast network of underground pipes is effective to carry the waste water and sewage to the respective disposal systems. The underground piping systems are generally constructed of concrete, clay or metal pipes which have a lifetime of many years. However, such piping systems do not last indefinitely. There are many external influences which can reduce the lifetime of such piping systems. For example, an accumulation of acids from the formation of hydrogen sulfide gas in the sewer attacks the material in concrete and asbestos cement pipes. The gases condense on the upper internal surface of the pipe and the resulting acids can deteriorate the pipe so that holes are eventually formed through the sidewalls, or the pipe becomes so porous that it is weakened and easily crumbles. While clay tile is generally not affected by the hydrogen sulfide gas or acids, the quality of the clay used to fabricate the clay tile can be of such inferior quality that the life of the pipe is greatly reduced. Metal pipes can be subject to corrosive action and breakage. Further, the sealed ends of any of these types of pipes can become defective over time, thereby allowing roots to grow therein. As the roots grow in size, the pipes become separated and allow sewage or waste water to leak into the surrounding soil. The movement of the soil such as by frost, shifting or earthquakes is another mechanism which can cause leaks in the piping system.

A recent concern of the integrity of the national underground piping systems is that of the environment affected by the piping system. Numerous environmental regulations have been implemented to control the integrity of the underground piping systems to preserve the quality of the water, air and soil. In view of the foregoing, a substantial concern has been generated over the quality of the present underground piping systems throughout the United States, and techniques for replacing the same due to the age or deterioration of the pipes themselves or entire systems.

Various techniques and apparatus have been developed for addressing the problem of replacing underground pipes, and especially sewer pipes. A major concern for the replacement of underground pipes is that of minimizing the disturbance of private or public property in replacing the pipes. For example, while the trenching or digging with a backhoe is effective to expose the old underground pipes for repair or replacement, such technique is extremely invasive and disturbing of the soil owned by the property owners. Furthermore, such replacement techniques are time consuming and thus represent a substantial interruption in the service to the customers using the underground pipes. To circumvent many of these problems, many techniques and devices have been developed for pulling a "mole" through the old piping system to break it up and provide a channel through which a new pipe is pulled. U.S. Pat. No. 4,983,071 by Fisk, et al. discloses a pipe bursting apparatus which is pulled through the old pipe to break it up, and new pipe attached to the bursting equipment is simultaneously pulled and thus installed in the path of the old pipe. This system requires a cable to be initially routed through the old pipe system and connected to a conical element for pulling through the old system and bursting the pipe. Connected to the conical element is a new plastic pipe which is pulled by the equipment and automatically routed in the path of the old system. U.S. Pat. No. 5,076,731 by Luksch discloses an element that is pulled through the old piping system to form an enlarged bore so that a correspondingly larger new pipe can be installed in lieu of the old pipe. In U.S. Pat. No. 4,930,542 by Winkle, et al., there is disclosed an underground pipe restoring technique for pushing new sections of pipe in the path of the old pipe. In the Winkle, et al. system, a frontal part of the apparatus is hydraulically operated to expand radially outwardly and break up the tile. Once the old tile is broken, a hydraulic ram in the back section pushes the new pipe sections forwardly, as well as pushes the frontal section forwardly into the old pipe, and thereafter the frontal element is again actuated to expand radially outwardly and break up the old pipe.

In many of the techniques disclosed in the prior art, the pipe bursting element must be pulled by a cable through the old pipe system. The disadvantage of such a technique is that the cable must be initially routed through the old pipe system, which effort can be extremely difficult if the old pipe system is broken and dirt or debris has otherwise fallen into the pipe. Further, an extremely large area must be dug into the soil at the distant end to provide room for pulling equipment, such as a winch. The prior art also includes pipe bursting equipment that is very complicated and expensive and subject to breakage or inoperability when soil or pieces of broken pipe fall into the mechanism.

From the foregoing, it can be seen a need exists for a new technique and apparatus for replacing underground piping systems without disturbing the surface soil and which can be carried out efficiently and reliably. A further need exists for a technique that can be operated in a manhole to replace old deteriorated pipes extending therefrom. Yet another need exists for a technique for replacing old underground pipes with new clay tile sections by pushing the new clay tile sections into the path of the old pipe. These and other needs are met by the features and advantages of the invention which are described in detail below.

SUMMARY OF THE INVENTION

In accordance with the present invention, techniques and apparatus are disclosed for replacing old or deteriorated underground pipes with new pipes, in such a manner as to eliminate or reduce the problems heretofore encountered. In accordance with an important feature of the invention, a rear hydraulic jack assembly situated in a manhole or excavated site is effective to push sections of new pipe and also push a frontal jack assembly to break up the old pipe and clear a path or burrow for the sections of the new pipe. The frontal apparatus includes a hydraulic jack situated between the foremost new pipe and a cone expander to push the cone expander. The movement or pushing force exerted on the cone expander can be exerted by a frontal jack, and thus can be independent of the rear hydraulic jack. In this manner, when the force required of the rear jack is insufficient to push both the string of new pipes as well as the cone expander to break up the old pipe, the rear and the frontal jacking apparatus can be operated independently to sequentially break up the old pipe and form a burrow, and then to advance the new pipe in the burrow.

According to the preferred embodiment of the invention, the frontal jacking apparatus includes a rigid cylindrical sleeve for housing a single-action hydraulic jack. The cylindrical sleeve and single-action jack are placed in front of the leading new pipe section to thereby provide a support from which the cone expander itself can be advanced forwardly by the operation of the single-action cylinder. The cone expander is connected to an elongate snout that is moved inside the old pipes and provides a directional mechanism for routing the frontal apparatus. Directly behind the snout is a tubular section having fins extending radially outwardly therefrom for either fracturing the old pipes or forming lines of weakness therein. Formed directly behind the finned section of the frontal apparatus is the cone expander which is forced through the old pipes to break them up and form a bore or burrow so that the new pipe sections can be more easily advanced along the path of the old pipe system.

The rear jacking system is constructed so that it can be situated in a manhole and utilized to push short sections of new pipe into the path of the old piping system, as well as push the frontal jacking system. This is accomplished by a double-action hydraulic jack that can be inserted into a section of the new pipe and lowered together into the manhole, whereupon the jack is operated to push the new pipe in a forward direction into the burrow. When the jack is operated to a fully extended position where the section of new pipe is pushed into the path, the jack is disengaged and raised to the ground level for placement into another section of new pipe.

According to an alternate embodiment of the cone expander, there is provided a cone which has an offset axis. This type of cone expander is highly useful for replacing old pipes that are laid adjacent to a rock bed or solid sidewalls, whereby the old pipe and surrounding soil is expanded in a direction away from the solid rock.

In yet other embodiments of the invention, a lubricant is piped from a surface reservoir through the new piping system to the frontal jacking apparatus. The lubricant is forced out of holes in the cone expander for lubricating such element as it is forced through the old piping system to break it and expand the surrounding soil, whereby the force required from the jacking apparatus is reduced.

According to yet another embodiment of the invention, multi-part pipe sections having an outer synthetic sidewall and an inner rigid steel pipe, can be utilized for replacement of the old underground pipes. In this embodiment, the rigid steel pipes are used as the mechanism in which the rear jack forces the multi-part pipe sections in the path of the old pipes, and which carry with it the synthetic outer sleeve. When the entire line of multi-part piping system has been installed, the inner rigid pipe is removed, whereby the outside synthetic pipe remains for carrying the waste water or sewage.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which.

DETAILED DESCRIPTION OF THE INVENTION

Figure 1:
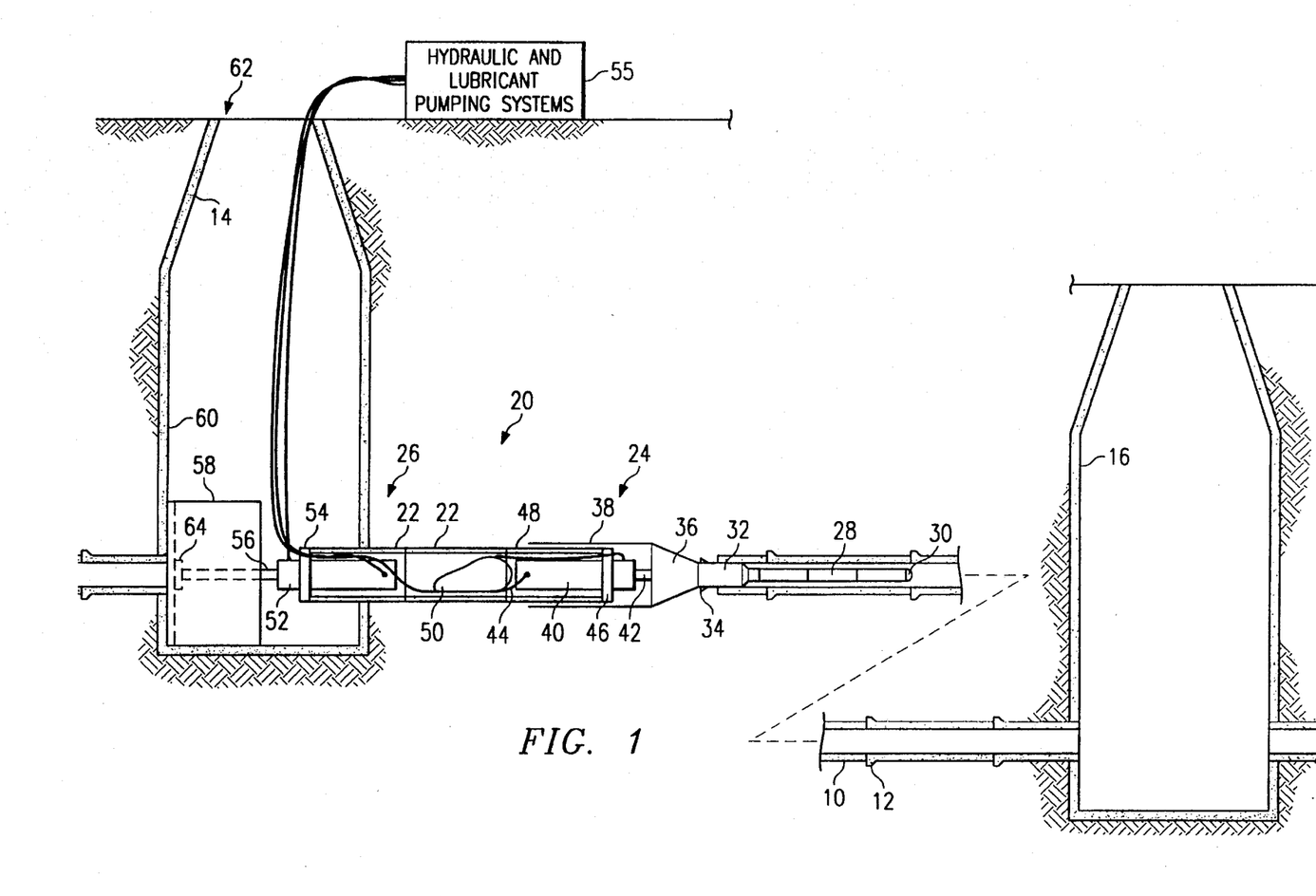
FIG. 1 is a side plan view of the pipe replacement apparatus according to the preferred embodiment of the invention, as utilized for replacing old underground pipes that extend between manholes.

FIG. 1 illustrates preferred embodiment of the invention operating to replace underground sewer pipes that may be constructed of clay, plastic, concrete or other material that can be broken. As will be apparent from the following description, the invention may find a wide variety of applications for replacing other than sewer pipes. A conventional underground piping system may utilize plural sections of old pipe 10 joined together at coupling joints 12, and extending between manholes 14 and 16 or other type of access vaults. The invention is particularly advantageous for replacing old underground pipes 10 which may be broken or leaking, or simply to replace such pipes due to age and before leaking occurs.

The pipe replacement system 20 according to the preferred embodiment of the invention is shown replacing the old pipe sections 10 with larger diameter new pipe sections 22. While the replacement with new, larger pipe sections is described herein, the invention is equally applicable for the replacement of the same size or even smaller size pipes. As shown in FIG. 1, the new pipe sections 22 are preferably a high quality, clay type structure having no exterior ribs or other discontinuities which would otherwise increase the resistance in pushing such pipe sections 22 through the soil. The clay pipe contemplated for use by the invention is identified as type "No Dig", obtainable from Mission Clay Products, Pittsburgh, Kans. As can be appreciated, the sections of old pipe 10 are broken up and moved out of the path of the new pipe sections, as will be described below.

The pipe replacement system 20 of the invention includes a frontal jacking assembly 24 and a rear jacking assembly 26. The frontal jacking assembly 24 of the preferred embodiment is comprised of an elongate snout 28 having plural sections, with a frontal section having a blunt or rounded end 30. The snout 28 is contemplated to be about 6 feet long. The snout functions to seek a routing path of the frontal jacking assembly 24 through the path of the old pipe 10. With this arrangement, the new pipe 22 is laid in essentially the same path as was the old pipe 10. Connected to the rearmost section of the snout 28 is a finned, cylindrical member 32 that has a diameter that is somewhat less than the inside diameter of the old pipe sections 10. The finned member 32 is rigid and can be constructed with steel tubing shaped from a larger diameter section to a smaller diameter section. Welded or otherwise fastened to the finned member 32 are plural fins 34 that extend radially outwardly from the body of the finned member 32. The fins 34 extend outward from the body of the member 32 about ½–2 inches, and function to fracture or crack the old pipe sections 10 when forced therethrough.

Joined to the back of the finned member 32 is a cone expander 36. The cone expander is a rigid conical member constructed of heavy gauge steel, and formed so as to have a frontal diameter about the same as that of the finned member 32, and with a rear diameter being somewhat larger than that of the diameter of the new pipe sections 22. Overall, the cone expander 36 is contemplated to be about 24 inches long, although this is not a constraint of the invention.

Suitably joined at the back of the cone expander 36 is a cylindrical sleeve 38 that operates telescopically with respect to a frontal jack 40. The frontal jack 40 is preferably of the hydraulic type having a plunger 42 that can be extended when a hydraulic fluid is forced into an inlet hose 44. A double-action hydraulic jack is preferable for use with the frontal jacking assembly 24, although a single-action type is necessary. The hydraulic fluid utilized to operate the frontal jack 40 can be of the type suitable for underground operations and of the noncontaminating type in the event hydraulic leaks occur. When the frontal jack 40 is operated to extend the plunger 42, the apparatus connected thereto is pushed forwardly to define a route of the new pipe, to fracture the old pipe sections 10, and to expand the path and form a new path for the pipe to be pushed therein. The apparatus preferably functioning to carry this out is the snout 28, the finned member 32 and the cone expander 36 with the attached sleeve 38.

The frontal jack 40 is welded to an annular collar 46 which, in turn, is loosely fastened to a cylindrical coupling shell 48 which telescopes within the cylindrical sleeve 38. Importantly, the back edge of the coupling shell 48 is constructed to mate with the front edge of the clay tile 22. To that end, the back edge of the coupling shell 48 is essentially the same configuration as that of the rear edge of a clay tile 22 to provide a mating fit therebetween. It is important to note that the telescopic movement of the sleeve 38 with respect to the coupling shell 48 prevents dirt and other debris from falling into the apparatus when the expanding cone 36 is pushed forward, and when the pipe sections 22 and the frontal jack 40 are pushed forwardly by the rear jacking assembly 26.

Figure 4A:
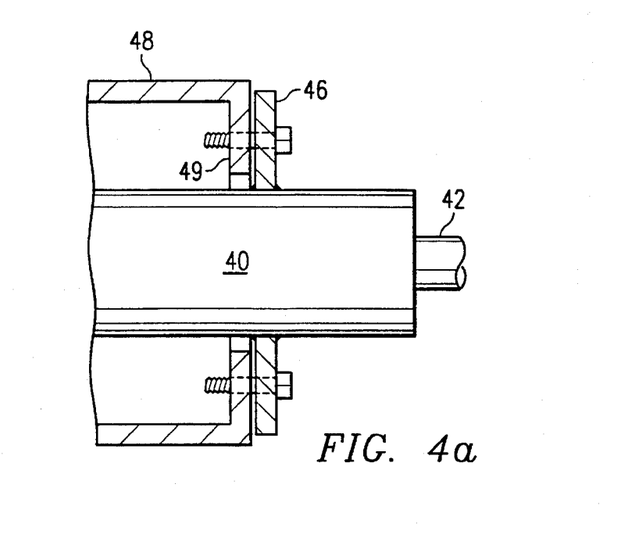
FIG. 4a is a partial sectional view of the connection between the frontal jack collar and the coupling shell.

FIG. 4a shows the manner in which the frontal jack 40 is connected to the coupling shell 48. The coupling shell 48 has a front end wall 49 that has a central opening through which the jack 40 protrudes. The collar 46 is loosely connected to the end wall 49 by about three bolts that are threaded into the coupling shell end wall 49, but not completely tightened. This loose fit allows a certain degree of axial misalignment between the parts. However, when the coupling shell 48 is pushed forward by the rear jack 52, the coupling shell end wall 49 abuts against the collar 46, thereby forcing the frontal jack 40 forward. It is contemplated that a yieldable spacer, such as a plywood plate, can be installed between the coupling shell 48 and the jack collar 46.

Further shown in FIG. 1 is a deformable bladder 50 which is connected by a hose to a hydraulic outlet of the frontal jack 40. The bladder 50 provides an enclosed expansion chamber for the hydraulic fluid or air during the expansion and retraction of the hydraulic plunger 42. During the operations in which the old tile sections 10 are broken and the new tile sections 22 are pushed through the path formed by the cone expander 36, the frontal jack 40 need only be of a single-acting type.

The rear jacking assembly 26 includes a rear jack 52 that is of the double-acting type, and with an annular collar 54 welded thereto. The rear jack 52 is shown in FIG. 1 partially inserted into a new pipe section 22 with the collar 54 engaging the back edge of the rear-most pipe section. The collar 54 is constructed so as to mate with the back edge of the new pipe sections 22. In this manner, when the collar 54 is forced in a forwardly direction, the rearmost pipe section 22 is also pushed forward, thereby pushing forward all the other pipe sections joined in front of it, as well as pushing the frontal jacking assembly 24. The collar 54 welded around the rear jack 52 has holes or slots formed therethrough (not shown) for feeding therethrough various hydraulic lines for operating both the rear jack 52 and the frontal jack 40. Also, and to be described in more detail below, lines carrying a lubricant, such as bentonite, can be extended through both the collar 54 and the new pipe sections 22 to the frontal jacking assembly 24 for allowing the lubricant to be injected outside of the cone expander 36. The lubricant reduces the force required to push the frontal jacking assembly 24 in a forward direction. Equipment 55 located at the surface can be manually operated to operate the hydraulic jacks 40 and 52, as well as the lubricating mechanism. The equipment 55 includes one or more hydraulic pumps and pressure gauges for monitoring the hydraulic pressure produced by the pumps. By monitoring the hydraulic pressure of the jacks 40 and 52, the progress of the jacking technique can be determined. For example, the hydraulic pressure of the rear jack 52 can be monitored, and when it rises significantly, this may be an indication that the frontal apparatus 24, and especially the cone expander 36, has encountered a repair coupler, clamp, rock or the like, around the old pipe 10. With an abnormal rise in the hydraulic pressure of the rear jack 52, it can be interrupted, and the frontal jack 40 can be activated to break the old pipe in addition to the repair coupler.

The rear jack 52 includes a plunger 56 having an end that works against a large area steel plate 58 that is curved in such a manner as to fully conform and engage a portion of the sidewall 60 of the manhole 14. The steel plate 58 is of such a size that it can be inserted into the opening 62 of the manhole and made engageable against the manhole wall 60. Welded to the end of the cylinder 56 is a metal plate 64 for providing engagement between the plate 58 and the hydraulic plunger 56.

Figure 2:
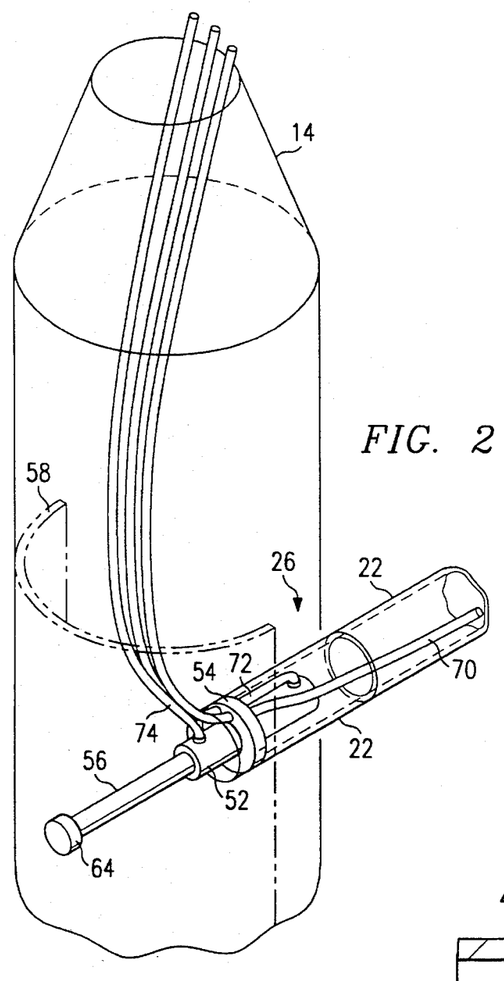
FIG. 2 is an isometric view of the rear jacking apparatus situated in the manhole, and engaged with a section of the new pipe for pushing thereof.

The details of the rear jacking assembly 26 are shown more clearly in FIG. 2. Hydraulic hose 70 is effective to provide hydraulic pressure to the frontal jack 40 for extending the plunger 42. Hydraulic hoses 72 and 74 provide hydraulic pressure for respectively expanding and contracting the plunger 56 of the rear jack 52. The rear jack 52 is preferably of the type which can exert the necessary force to push the new tile sections 22 through the path formed by the frontal jacking assembly 24. The frontal jack 40 is of the type which can produce the necessary force for fracturing the old pipe sections 10 and expanding the same to define a bore for the new pipe sections. As can be appreciated, the force applied to the rearmost new pipe section is applied to the back edge thereof by the collar 54 of the rear jack 52. The joint of each new pipe section 22 therefore must transfer the force to the pipe section ahead of it, all without breaking or otherwise damaging the joints of the new pipe sections. Importantly, the joints of the new pipe sections are constructed so as to provide a seal therebetween, and with an annular washer between the pipe sections to transfer a uniform force around an annular edge of one pipe to the next pipe. Preferably the annular flat washer is fabricated of plywood or other hard rubber material to transfer the jacking force between the pipe sections, without an actual clay material contact therebetween which might not be able to handle the jacking force required. The hard deformable washer eliminates point loading between the clay tile sections and possible cracking that may result therefrom. The plywood washer does not constitute the fluid seal between the pipe sections. Rather, a rubber seal that engages one section with the other provides the seal between the pipe sections. The clay tile identified above has a pipe joint of such construction.

Figures 3, 4B, 5:
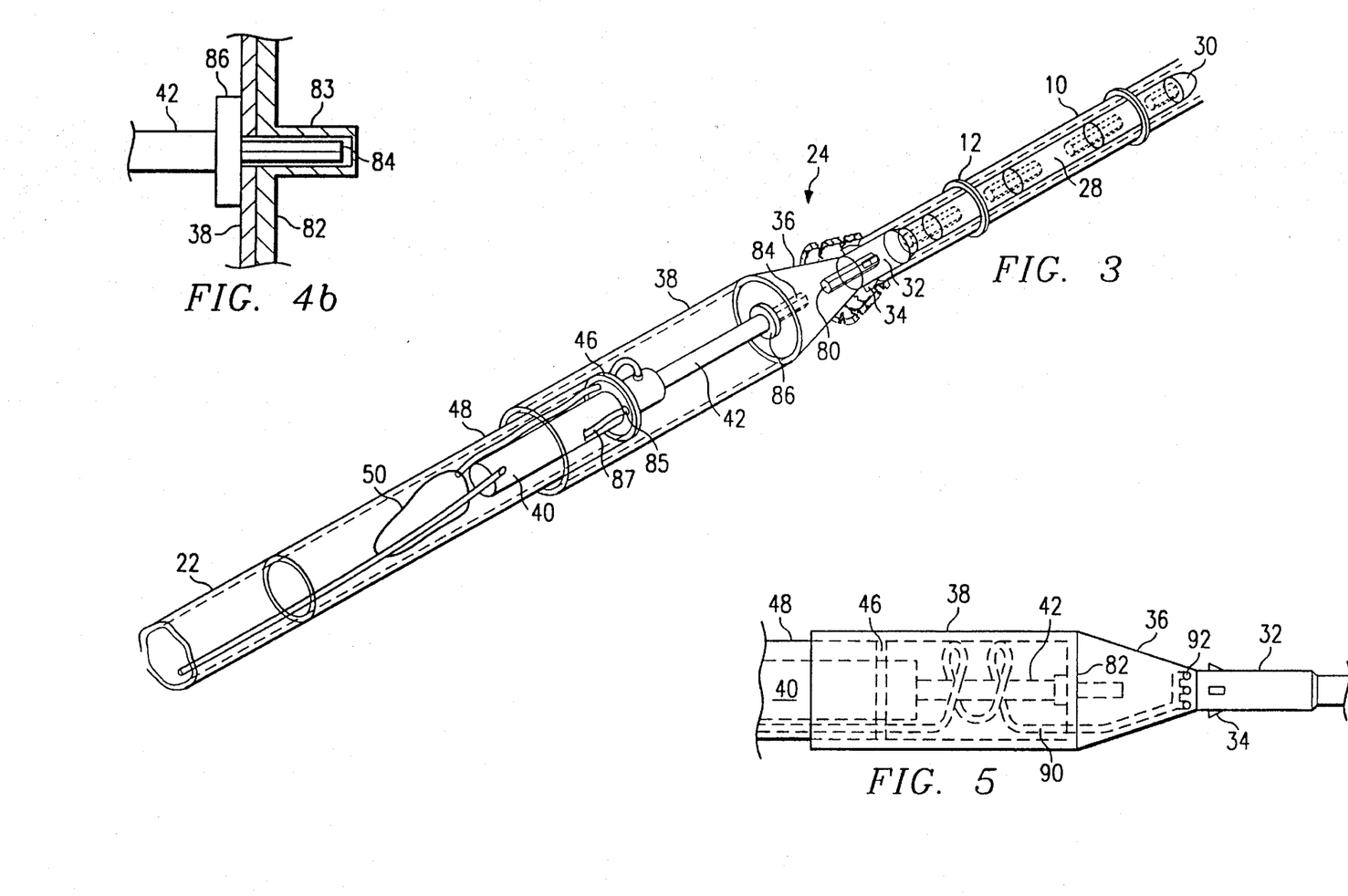
FIG. 3 is an isometric view of the frontal jacking apparatus according to the preferred embodiment of the invention, as pushed by a foremost section of the new pipe, and shown breaking up the old piping system.
FIG. 4b is a partial sectional view of the coupling arrangement between the frontal jack and the cone expander.
FIG. 5 is a side view of the cone expander and associated apparatus for providing a lubricant to the system for reducing the pushing force required to break up old pipes and advance new pipes in the path.

With reference now to FIG. 3, the frontal jacking assembly 24 is shown in greater detail. The internal coupling apparatus is shown connecting the various components of the frontal jacking assembly 24 together. The coupling mechanism for each component of the frontal jacking assembly 24 comprises a hexagonal-shaped stub that is insertable into a corresponding hexagonal-shaped female member of each of the components. The hexagonal stub 80 is shown, for example, coupling the cone expander 36 to the finned member 32. The components can be pinned to the hexagonal stub 80 during assembly in the manhole 14 to thereby fix the components together. This interconnecting arrangement provides a highly versatile construction that allows, for example, the snout 28 to be of any desired length. Advantageously, different diameter finned members 32 can be connected to the snout to accommodate different size sections 10 of old pipe. In a similar manner, different shapes and sizes of cone expanders can be connected to the finned member 32. Also, there may be situations where the finned member 32 is not required at all, whereby the hexagonal coupling sections allow the cone expander 36 to be connected directly to the snout 28.

As further shown in detail in FIG. 4b is the coupling arrangement between the plunger 42 of the jack 40 and the cone expander. The large diameter end of the cone expander 36 has an end wall 82 formed of a thick steel plate that is welded to the cone-shaped sidewall. Formed in the center of the end wall 82 is hexagonal-shaped female member 83 for receiving a hexagonal-shaped coupling stub 84 that is fastened, such as by welding, to the plunger 42 of the frontal jack 40. Welded near the end of the jacking plunger 42 is an annular shoulder 86 to provide a surface area for engagement with the back sidewall 82 of the cone expander 36, via the frontal end wall of the sleeve 38. The sleeve end wall has a hole therein for passing therethrough of the hex stub 84. With this arrangement, when the plunger 42 is extended forwardly, the shoulder 86 pushes against the front end wall of the sleeve 38 and the back expander sidewall 82, thereby forcing the cone expander 36 in a forward direction.

An advantage with the coupling arrangement of the components of the invention is that additional components can be interposed in the train of components. For example, an additional conical section can be coupled to the back of the cone expander 36 to extend the conical sidewall and achieve a larger diameter expander, thereby allowing a larger diameter pipe section to replace the old pipes 10. Other components can be interposed in the component train in a similar manner.

With reference again to FIG. 3, the collar 46 includes a lubricant hose fitting 85 attached thereto connected to a lubricant line 87. The lubricant line 87 extends through the new pipe sections 22 to the surface equipment 55. When the lubricant pump in the surface equipment 55 is activated, the lubricant is forced into the chamber formed by the sleeve 38 and the collar 46. Preferably, the lubricant is pumped into the sleeve chamber after the plunger 42 of the frontal jack 40 is extended, i.e., after the cone expander 36 has been pushed forward to break up the old pipe 10. Hydraulic controls in the surface equipment 55 are activated to allow the frontal jack 40 to become retracted. After the sleeve chamber is filled with the lubricant, the rear jack 52 is activated to advance the new pipe sections 22 forward. This forward movement of the new pipe sections 22 forces the coupling shell 48 and the frontal jack 40 forwardly, thereby retracting the plunger 42 of the frontal jack 40. The forward movement of the frontal jack collar 46 reduces the volume of the sleeve chamber and compresses the lubricant. The only escape for the lubricant is through the annular space between the coupling shell 48 and the sleeve 38. The escape of the lubricant through this annular path is effective to provide a lubricant in the path of the advancing new pipe sections 22. It should also be noted that even if the plunger 42 of the frontal jack 40 is in a retracted position, the pumping of the lubricant into the sleeve chamber is effective to squeeze the lubricant through the annular sleeve-shell space, thereby providing a lubricant in the path formed by the cone expander 36.

FIG. 5 illustrates a side view of a portion of the frontal jacking assembly 24, showing an alternate form of lubricating equipment. A lubricating hose 90 can extend through the new pipe sections 22, through the collar 46 of the frontal jack 40, as well as through the back sidewall 82 of the cone expander 36. The cone expander 36 can be equipped with a number of weep holes 92 at its small-diameter end. The weep holes 92 located around the frontal end of the cone expander 36 and preferably behind the fins 34 of the finned member 32, are connected by internal tubes to the lubricant hose 90. As shown in FIG. 5, the lubricant lines 90 can be coiled in a helical manner within the sleeve 38 and thereby accommodate the telescopic movement between the sleeve 38 and the coupling shell 48. In this manner, a reservoir and lubricating pump located at the surface can be operated to force a lubricant, such as bentonire, through the hose 90 and the holes 92 and thereby inject the lubricant at the leading edge of the cone expander 36. As noted above, the lubricant functions to reduce the force required to break the old pipe sections 10 and burrow a new, larger path to be followed by the new pipe sections 22. It should also be understood that the lubricant dispensing technique described in connection with FIG. 3 can be utilized with the weep holes 92 formed in the cone expander 36 of FIG. 5. In other words, the helical coil tubes in the sleeve chamber can be eliminated and one or more holes can be formed in the back wall 82 of the cone expander 36. When the lubricant is squeezed or compressed in the sleeve chamber, the lubricant will escape out of both the annular shell-sleeve spacing and the weep holes 92. This principle can also be extended to the dispensing of a lubricant in weep holes formed in the finned member 32.

The apparatus according to the preferred embodiment shown in FIGS. 1–4, operates in the following manner. The opening in the sidewall of the manhole 14 associated with the old pipeline may need to be enlarged with a jack hammer, or the like. The components of the frontal jacking assembly 24 are lowered into the manhole 14 via the opening 62. The components are assembled together using the hexagonal joints described above. The snout 28 is inserted through the manhole wall into the old pipe sections 10 with the finned member 32 and the cone expander 36 connected thereto, the latter component being suspended in the manhole 14 as needed. Next, the frontal jack 40 and the coupling shell 48 are slid into the sleeve 38 and lowered into the manhole as an assembly. Hydraulic hoses are connected to the frontal cylinder 40 so as to operate it in a double-acting manner. The arcuate steel plate 58 is then lowered into the manhole and engaged against the back wall 60 of the manhole 14. A number of spacer blocks (not shown) can be positioned behind the frontal jack 40 and the plate 58 so that it can be operated to force the plunger 42 forwardly, thereby also moving the cone expander 36, the finned member 32 and the snout 28 into the sections of the old pipe 10. Depending upon the reach of the plunger 42 a number of extensions may be required, together with additional spacer blocks, to fully push the cone expander 36 and sleeve 38 outwardly beyond the sidewall of the manhole 14. In carrying out this operation, several sections of the old pipe 10 will be broken up and the cone expander 36 and sleeve 38 will have provided a short burrow in the path of the old pipes 10. After the frontal jacking assembly 24 has been fully pushed beyond the sidewall of the manhole 14, one hydraulic hose is removed and the bladder 50 is connected to the front hydraulic port of the frontal jack 40. The frontal jack 40 can then be operated in a single-action manner.

Continuing with the jacking operation, the rear jack 52 is inserted into a new pipe section 22 at the surface, and lowered into the manhole 14. Then, the hydraulic hose of the frontal jack 40 is threaded through the new pipe sections 22, through a hole or slot in the collar 54 of rear jack 52, and all the hydraulic lines, and a lubrication hose if utilized, are connected to the surface operating equipment 55. It should be noted that because of the small diameter of the manhole 14, e.g., about 4 feet, the plunger 56 of the rear jack 52 is initially in a retracted position when lowered into the manhole 14. After the rear jacking assembly 26 and the first new pipe section 22 are assembled and lowered into the manhole, the frontal edge of the new pipe section is engaged with the rear edge of the coupling shell 48 of the frontal jacking assembly 24. When configured in this manner, the surface operating equipment 55 is activated to forcefully extend the plunger 56 of the rear jack 52, thereby pushing the body of the rear jack 52 forward, and therewith pushing the new pipe section 22 as well as the frontal jacking assembly 24. The surface equipment can also be activated to provide lubricant to lubricate the frontal jacking assembly 24 when desired.

It should be noted that depending upon the type of soil and old pipe 10 and the ease with which it can be destroyed, the frontal jack 40 may not have to be operated. Rather, the force provided by the rear jack 52 may be sufficient itself to move the new pipe sections 22 forward as well as break up the old pipe 10 with the cone expander 36. In this mode of operation, the plunger 42 of the frontal jack 40 will continue to be in a retracted position and thus is not utilized. As the new pipe section 22 is fully pushed beyond the sidewall of the manhole 14, the plunger 56 of the rear jack 52 is retracted and the jack 52 is raised to the surface to be reinserted into another section of the new pipe 22. The foregoing steps continue to be carried out to push the frontal jacking assembly 24 forwardly and break up the old tile 10 as well as force the new pipe sections 22 in the path or burrow formed by the cone expander 36 and sleeve 38.

In the event that the hydraulic force required to push the entire new pipeline 22 and frontal jacking assembly 24 exceeds a predefined amount, due to the type of soil or the type of old pipe 10, the operation of the frontal jack 40 may be required. During this alternate mode of operation, the plunger 56 of the rear jack 52 is extended and remains in an extended position to hold the new pipe sections 22 stationary. Then, the surface equipment is operated to independently cause the plunger 42 of the frontal jack 40 to be extended. The extension of the frontal jack 40 causes the snout 28, the finned member 32 and the cone expander 36 and sleeve 38 to be pushed forwardly to thereby break up the sections of old pipe 10. With this operation, no force at this time is required to move the new sections of pipe 22, but only to fracture and break the old pipe sections 10 and to expand the soil by the action of the cone expander 36. Because the frontal jack 40 is configured only as a single action cylinder, the subsequent operation of the rear jack 52 in pushing and advancing a new section of pipe 22 into the burrow, is effective to retract the sleeve 38 over the coupling shell 48 and the plunger 42 into the frontal jack 40 as they are pushed toward the cone expander 36. Rather than moving the cone expander 36 forwardly, this forward movement of the new pipe sections 22 and the frontal jack 40 only results in the retraction of the frontal jack plunger 42. Thus, it can be seen that in this latter alternating operation between the rear jack 52 and the frontal jack 40, the rear jack 52 is effective to push new pipe sections into the burrow, and the frontal jack 40 is effective to break the old pipe 10 and provide an expanded burrow. Those skilled in the art may find that while the alternate operation of the jacks 40 and 52 provide the results noted above, there may be other advantages in operating both jacks simultaneously.

Once the snout 28 begins to protrude through the end of the old pipe section 10 and into the destination manhole 16, the frontal jacking assembly 24 can be disassembled. In the disassembly, the sections of the snout 28 can be uncoupled as they appear in the destination manhole. The uncoupling of the finned member 32 and the expander cone 36 and sleeve 38 can also be accomplished by virtue of the male and female hexagonal couplers 80. Lastly, the frontal jack 40 can be removed and decoupled from the hydraulic and lubricant lines for removal thereof. The sidewall of the destination manhole 16 will have to be enlarged with a jackhammer before the frontal jacking assembly begins to protrude into the manhole 16.

Figures 6, 7, 8:
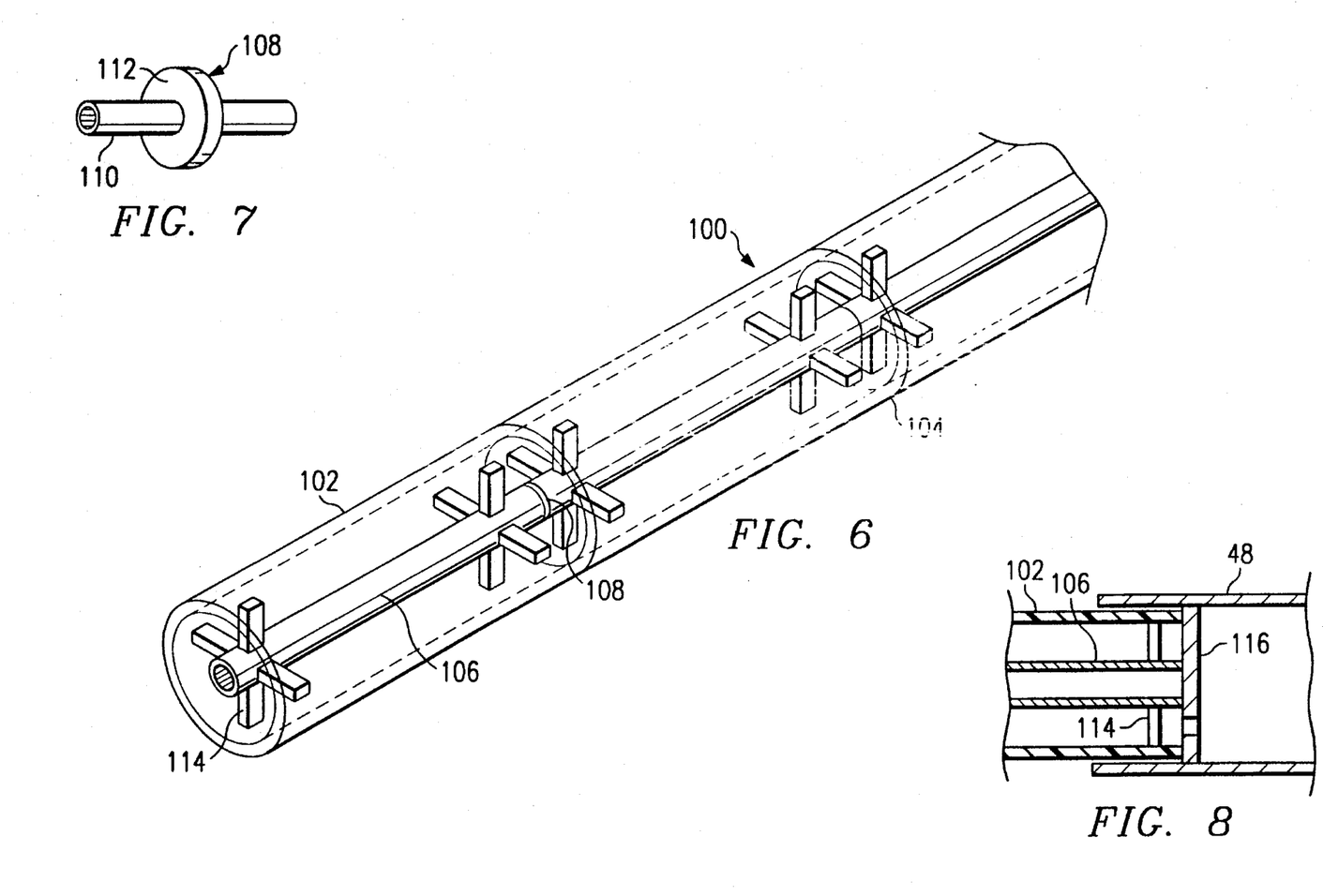
FIG. 6 is an isometric view of a portion of a multi-part pipe having an outer synthetic sidewall and an inner rigid pipe supported thereby.
FIG. 7 is an isometric view of a pipe coupler for coupling the rigid pipe of the embodiment of FIG. 6.
FIG. 8 is a partial side sectional view of the engaging arrangement of the multi-part pipe of FIG. 6 with the frontal jacking assembly.

FIG. 6 illustrates a multi-part pipe structure that can be advantageously utilized in accordance with the invention. The pipe structure 100 includes an outer synthetic pipe 102 suitable for joining together at a joint 104 that is sealed by a rubber seal (not shown) or otherwise, to carry sewage or other liquids. Supported within the synthetic pipe 102 is a steel pipe 106 that can be coupled together by a coupler 108. The coupler 108 is shown in more detail in FIG. 7. The coupler includes a small pipe section 110 that can be inserted into the ends of the pipe sections 106 to be joined to maintain such pipes axially aligned. An annular plate 112 prevents axial movement of the coupler 108 within the steel pipes 106 during jacking of the multi-part pipe 100. The steel pipes 106 are supported within the outer synthetic pipe 102 by plural spacers 114. The spacers 114 extend radially outwardly from the steel pipes 106, much like a spoke to maintain a central spacing of the pipe 106 within the outer synthetic pipe 102. The spacers 114 can be suitably fastened to the steel pipe 106 by forming thereon threaded studs for securing into threaded holes formed within the steel pipe 106. While four supports 114 are shown at spaced-part locations on the steel pipe 106, those skilled in the art may find that different numbers of spokes can be advantageously utilized. Also, there is shown one steel pipe 106 supported within a single section of synthetic pipe 102, but such arrangement can be varied. According to the present invention, the synthetic pipes 102 can be constructed of plastic or fiberglass, and the steel pipes 106 can be of short sections suitable for use in replacing underground pipes from a small manhole 14.

In operation, a section of the multi-part pipe 100 can be lowered into the manhole and the rear jack 52 abutted against the end of the steel pipe 106. The steel pipe is preferably constructed of a material and a sidewall thickness to transfer the jacking forces therethrough and thus to push the multi-part pipe 100 through the burrow formed by the frontal jacking assembly 24. The synthetic outer pipe 102 is carried with the steel inner pipe 106 during the forward movement of the latter. While not shown, the frontal jacking assembly 24, and particularly the coupling shell 48 would be modified to have a back section as shown in FIG. 8. Here, a thick steel plate 116 would be welded in a recessed manner within the coupling shell 48. The inside diameter of the coupling shell 48 would be somewhat larger than the outside diameter of the synthetic outer pipe 102, so that the latter could fit into the former and maintain registry therebetween. The internal steel pipe 106 would abut against the plate 116 and transfer the pushing force from the sections of the steel pipe 106 to the coupling shell 48. The coupling shell 48 would otherwise be constructed as shown in FIG. 3. Because the coupling shell 48 extends over the outer synthetic pipe 102, as shown in FIG. 8, dirt, debris and broken particles of the old pipe are prevented from entering the apparatus when the entire train of apparatus, including the new pipe sections 100, are pushed through the old pipe sections. As can be appreciated, from the foregoing arrangement, the pushing force exerted by the rear jacking assembly 26 is not transferred via the synthetic outer pipe 102, but rather is transferred by way of the inner steel pipe 106. After the old pipe has been completely replaced with the multi-part pipe 100, the center steel pipe 106 can be removed, thereby leaving the synthetic outer pipe 102 for carrying liquids.

Another variation of the replacement of old pipes 10, is a technique for utilizing new pipe sections, such as small diameter clay tile, that cannot withstand a substantial jacking force. In this case, temporary steel pipe sections suitably joined together can be jacked into the path or burrow much like the operation shown and described in connection with FIGS. 1–3. The steel pipe is preferably of a type that can withstand substantial jacking forces, and is preferably of a diameter larger than the replacement clay tile. After the frontal jacking assembly 24 and the temporary pipe have been fully jacked into the old pipeline 10, the new clay tile is jacked in behind the temporary steel pipe, thereby pushing the steel pipe out the destination end. The temporary pipe functions to form a bore somewhat larger than the clay tile so that the clay tile can be jacked using less jacking force. The initial lubrication utilized during the jacking of the temporary pipe will also serve to reduce the jacking force for the clay tile. In this technique, those skilled in the art may find it advantageous to provide an interface plate between the first new clay tile section and the last temporary pipe section. The interface plate will maintain axial registry between the different pipelines and facilitate the following of the clay tile behind the temporary pipe section.

In yet another variation of the foregoing, the steel pipe can be jacked into the path of the old pipe, and thereafter smaller diameter carrier pipe can be run through the steel pipe, whereupon both the outside steel pipe and the inner carrier pipe remain in place. This technique is especially advantageous where regulations require an outer rigid steel pipe functioning as a jacket around the inner fluid carrying pipe. Sewer pipes that extend under highways and streets often require this type of arrangement.

Figure 9:
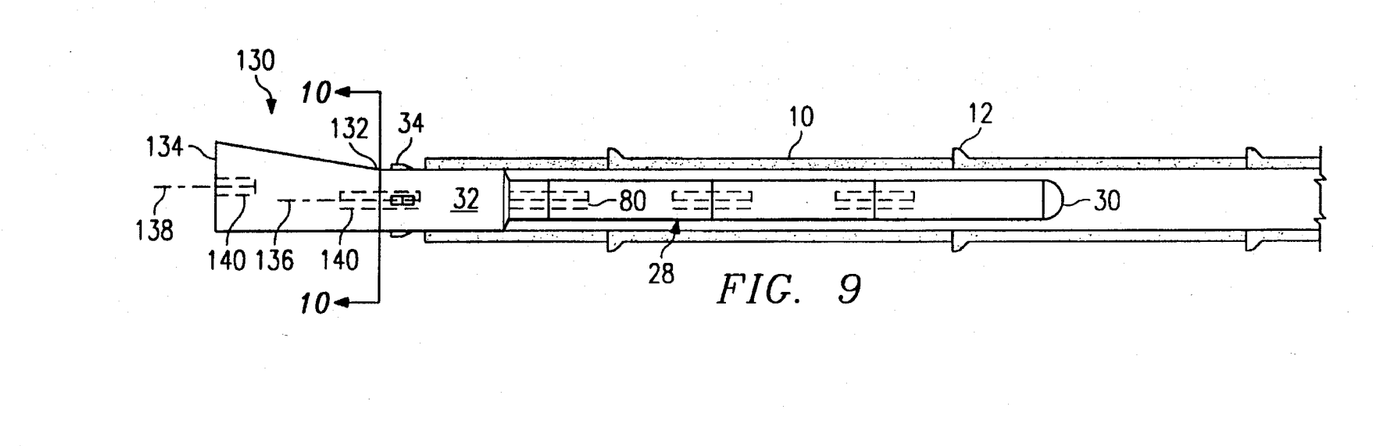
FIGS. 9 and 10 are respective side sectional and end views of an alternate embodiment of the cone expander according to the invention, with a conical element adapted for use where the old pipes are buried adjacent a rock bed or other nonmovable sidewall.
Figures 10, 11:
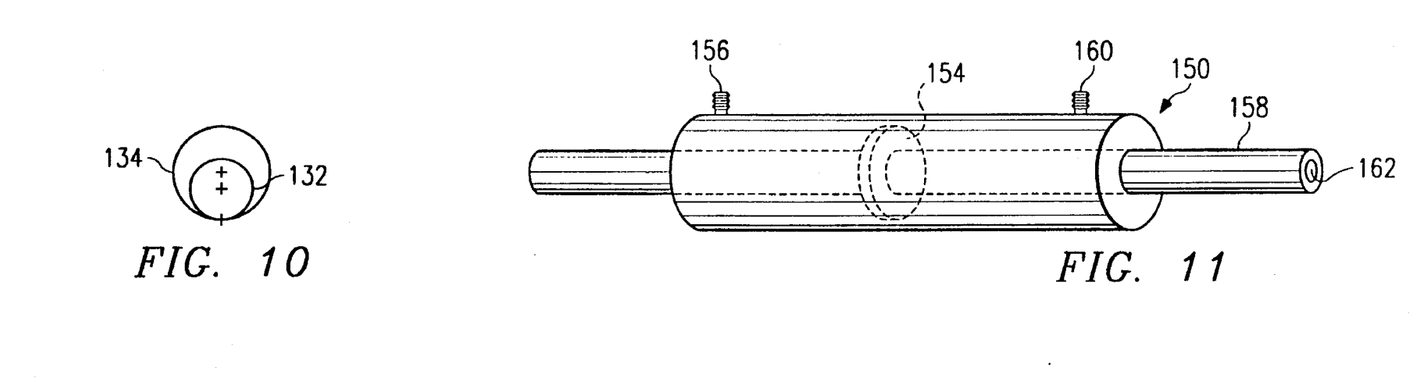
FIG. 11 is a side view of a jack according to another embodiment of the invention.

In accordance with another embodiment of the invention, there is shown in FIGS. 9 and 10, an offset cone expander 130 that is adapted for use where the old underground pipe 10 is located adjacent an immovable wall, such as a bedrock bottom or rock vertical sidewall, or utilized in old pipes where the top portion has deteriorated due to condensed gases and acids. The cone expander 130 shown in FIG. 9 has a circular front end 132 of a diameter about the same size as that of the finned member 32. The cone expander 130 includes a larger diameter circular section at the back edge 134 to thereby expand the soil and old broken pipe pieces in an outward direction. However, an axis 136 of the small diameter frontal end 132 is displaced or offset with respect to the axis 138 of the large diameter rear end. While not shown, the frontal end 132 and the rear end 134 of the offset cone expander 130 are capped with large thick steel end plates that have formed therein the hexagonal female coupling arrangements, shown are reference character 140. The respective axes 136 and 138 of the front and rear parts of the offset cone expander 130 are aligned with the respective female coupling members 140.

In operation, the offset cone expander 130 can be coupled to the finned member 32 and therethrough to the snout 28 as shown in FIG. 9, in situations where the old pipe 10 is located on a bed of rock. When the frontal jacking assembly 24 outfitted with the offset cone expander 130 is forced through the old pipe section 10, the conical surface located on the top and side portions of the expander 130 will force the soil and broken pipe debris upwardly and outwardly, but will not force the material in a downward direction toward the rock floor of the old piping system. The advantage with utilizing the offset-cone expander 130 with an old pipeline adjacent an immovable sidewall or bottom, is that the path formed by the frontal jacking assembly 24 tends to be maintained aligned with the old pipe system, rather than being skewed because of the influence of the solid rock bed or sidewall near the old piping system. In the event that it is known that the old piping system is adjacent a solid sidewall, then the offset cone expander 130 can be turned sideways, as compared to that shown in FIGS. 9 and 10, with the conical sections disposed away from the solid sidewall. Those skilled in the art may find that other shapes or departures from the offset cone expander 130 shown in FIGS. 9 and 10 may be utilized to overcome difficulties or problems encountered in the texture or configuration of the earth adjacent the old pipe system.

In accordance with another embodiment of the invention, there is disclosed in FIG. 11 a hydraulic jack 150 adapted for use with the invention, but which can be utilized without long term interruption of the flow of waste from the old pipe system 10 to the new pipe system 22. The jack 150 includes a conventional body 152 having an internal bore (not shown) and a seal 154 operable in the bore, in a conventional manner to allow hydraulic fluid to be pumped into one port 156 to advance the plunger 158 forwardly, or to be pumped in another port 160 to force the plunger 158 in an opposite direction. In the hydraulic jack 150 of FIG. 11, the plunger 158 includes an internal bore 162 therethrough for carrying the liquid from the old pipe 10 to the new pipe sections 22. Also, the plunger 158 of the hydraulic jack 150 extends all the way through the body 152, with seals (not shown) on each end of the body for sealing the ends of the plunger 158 thereto. With this arrangement, the hydraulic jack 150 does not block or otherwise present an impediment to the flow of liquid from the old system to the new system. When utilizing the hydraulic jack 150 of FIG. 11, the remainder of the system and the frontal jacking assembly 24 also requires a path therethrough. To that end, the blunt end cap 30 of the snout 28 is either removed or provided with a bore therethrough, as are all the hexagonal coupling joints joining the components of the frontal assembly 24 together. In this manner, a fluid flow path is provided completely through the frontal assembly, from the old pipes 10 to the new pipe sections 22. Further, with this arrangement, the rear jack assembly 26 also requires a hydraulic jack 150 of the type shown in FIG. 11 for coupling the waste through the manhole 14 and to the old pipe section extending on the side thereof. Hence, if it is contemplated that a pipe replacement is required to be carried out over a long period of time, then the apparatus of FIG. 11 can be utilized and arranged as shown in FIG. 1 to provide a continuous fluid flow path of waste water during the times of use by the residents. Of course, during the periods of nonuse of which the customers would be informed, the continuous flow path would be interrupted when the rear jacking assembly 26 is removed and new pipe sections are added, as described above.

The flow-through jack 150 of FIG. 11 can also be advantageously utilized as an intermediate jack when jacking long runs of pipe. Because the skin friction of long runs of pipe can be substantial, the jacking of all the pipe sections at one time may be difficult or prohibited, as the rearmost pipe section may not be able to withstand the axial jacking force necessary to move all the pipe sections in a long string of such pipes. By utilizing one or more intermediate jacks between the frontal and rear jacks 40 and 52, the intermediate sections of new pipe can be moved forwardly in a manner independent of the other pipe sections. For example, for each 100 feet of new pipe, there can be installed an intermediate jack joined between pipe sections for pushing the 100 feet of pipe in front of it in a forward direction. Each 100 feet run of new pipe can be moved forward in an inch-worm manner so that the entire run of pipe does not need to be moved in unison by the rear jack 52. Of course, hydraulic hoses would be extended inside the new pipe sections 22 and connected to each of the intermediate jacks 150. As each intermediate jack approaches a manhole or a service connection, it can be removed so that the new pipe sections can be joined together and sealed. The flow through capability of the jack 150 allows the new pipe sections to carry water or fluid during the jacking operation.

While the foregoing illustrates and discloses the preferred and other embodiments of the invention with reference to specific structures and techniques, it is to be understood that many changes in structure and operation may be made as a matter of choices without departing from the spirit and scope of the invention, as defined by the appended claims.

What is claimed is:

1. A method for replacing old underground pipes with new pipes, comprising the steps of:
   a) pushing a cone expander into a path of the old underground pipe and using forward motion of the cone expander to form a burrow in the path of the old underground pipe;
   b) interposing sections of the new pipe behind the cone expander so that when the sections of new pipe are pushed, the cone expander is pushed ahead by the movement of the new pipe sections;
   c) pushing the sections of new pipe forward by a force exerted on a rear-most new pipe section to thereby force the cone expander forwardly to form the burrow and at the same time advance the new pipe sections forwardly in the path of the old pipe, whereby the cone expander and the new pipe sections are moved at the same time; and
   d) when a force exerted on the rear-most new pipe section exceeds a predefined amount, then alternately maintaining the rear-most new pipe section stationary while forcing the cone expander forwardly to form the burrow, and thereafter moving the new pipe sections forwardly while maintaining the cone expander stationary, whereby the burrow is formed and the new pipe sections are advanced alternately.

2. The method of claim 1, further including forcing the rear-most section of new pipe with a hydraulic jack acting against an internal sidewall of a manhole.

3. The method of claim 1, further including fracturing the old pipe with a leading portion of the cone expander and radially expanding the old pipe outwardly into soil surrounding the old pipe with a conical portion of the cone expander.

4. The method of claim 1, further including inserting a hydraulic jack into a short section of the new pipe, lowering the short section of the new pipe and the hydraulic jack therein into a manhole, and extending the hydraulic jack between an anchor and the new pipe section lowered into the manhole.

5. The method of claim 1, further including halting forward movement of a plunger of a rear-most hydraulic jack while a forward-most hydraulic jack is activated to force the cone expander in a forward direction to break the old pipe.

6. The method of claim 1, further including injecting a lubricant into a chamber associated with a frontal hydraulic jack, and contracting the chamber when a plunger of the frontal hydraulic jack is retracted to thereby dispense the lubricant through an opening in the chamber.

7. The method of claim 1, further including breaking up the old pipe and jacking in the path thereof new pipe while allowing liquid in the old pipe to drain through the new pipe by using a cone expander to generally block the old pipe so that liquid does not leak out of the broken pipe, but allows the liquid to drain through a central bore in the cone expander to the new pipe sections.

8. Apparatus for replacing old underground pipes with new pipes, comprising:
   a cone expander for breaking up the old underground pipes and forming a burrow in the path of the underground pipes;
   a snout movable inside the old underground pipe, and attached to a front end of the cone expander for defining a path aligned with the old underground pipe;
   a frontal jack for pushing the cone expander in a forward direction to break up the old underground pipe;
   a sleeve attached to the cone expander and operable in a telescopic manner with a coupling shell to house the frontal jack during operation thereof, said coupling shell being adapted to engage a frontal edge of a new pipe; and
   a rear jack operable to push the new pipes in the burrow formed by the cone expander.

9. The apparatus of claim 8, further including a finned member attached between the cone expander and the snout to fracture the old underground pipe when forced therein.

10. The apparatus of claim 8, further including in combination clay tile sections defining said new pipes, said clay tile sections having a fluid seal coupling and no exterior discontinuities, and with a deformable washer between sections of new pipe to prevent a clay tile to clay tile contact when forcefully pushed by said rear jack.

11. Apparatus for replacing old underground pipes with new pipes, comprising:

a cone expander for engaging the old underground pipe and breaking the old underground pipes and expanding the same outwardly to form a burrow for receiving the new pipes therein;

a jack for transferring a pushing force to the cone expander to force the cone expander forwardly to break up the old pipe;

a coupling member engageable with the jack and a new pipe section for allowing the jack to produce an extension force between the new pipe section and the cone expander; and a sleeve operable in a telescopic manner with respect to said coupling member during expansion and retraction of said jack and to provide a cover around said jack to prevent dirt and debris from inhibiting movement thereof.

12. The apparatus of claim 11, further including a finned member attachable to said cone expander for fracturing the old pipe before being expanded by said cone member.

13. The apparatus of claim 11, wherein said jack includes a plunger removably attached to said cone expander by a male and female joint.

14. The apparatus of claim 11, wherein said cone expander has weep holes in a leading edge, and means for forcing a lubricant through said weep holes.

15. The method of claim 1, further including breaking up the old pipe when the cone expander is pushed forwardly.

16. The method of claim 1, further including pushing the cone expander forwardly by extending a plunger of a frontal hydraulic jack, and pushing the new pipe sections forwardly by a force applied to a rear-most new pipe section to retract the plunger of the frontal hydraulic jack.

17. The method of claim 16, further including protecting the frontal jack from debris by mounting a telescoping assembly around the frontal hydraulic jack which shields the frontal jack during retraction and extension of the plunger thereof.

18. The method of claim 1, further including connecting an elongate snout to the cone expander, and connecting the cone expander to a frontal hydraulic jack.

19. The method of claim 18, further including interconnecting the frontal jack, the cone expander and the snout by using male and female connecting members to facilitate assembly thereof and interchangeability of the parts thereof.

20. The method of claim 18, further including mounting the frontal hydraulic jack so as to be supported against a front most new pipe section, and fixing a tubular shield for movement with the plunger of the hydraulic jack, said shield moving telescopically about said jack so as to prevent debris from interfering with the operation of the movement of the jack plunger.

21. A method of replacing old underground pipes with new pipe, comprising the steps of:

mounting a frontal apparatus, including a hydraulic jack, in front of a new pipe section so that when actuated, the hydraulic jack pushes from the new pipe section;

pushing a cone expander forwardly through the old underground pipes by forward movement of a plunger of the hydraulic jack to break up the old underground pipes;

providing a cylindrical sleeve as an enclosure around an area of the hydraulic plunger; and telescopically moving the cylindrical sleeve about the hydraulic jack as the plunger is reciprocated so that debris formed by the burrow does not fall between the hydraulic cylinder and plunger and interface with reciprocating action between the plunger and the hydraulic jack.

22. The method of claim 21, further including mounting a coupling shell between the hydraulic jack and the new pipe section, and allowing the cylindrical sleeve to telescopically move over the coupling shell.

23. The method of claim 21, further including removably attaching the cone expander to the hydraulic jack plunger.

24. The method of claim 21, further including removably attaching a finned member to the cone expander so that different sizes of finned members can be connected to the cone expander.

25. Apparatus for replacing old underground pipes with new pipe sections, comprising:

a cone expander having a conical frontal end for forcing old pipe sections radially outwardly to break the old pipe in pieces and force the pieces into the surrounding soil;

a cylindrical sleeve engaged at a back portion of the cone expander for preventing soil from falling into a burrow formed by the cone expander;

a frontal jack adapted for pushing between a foremost new pipe section and the cone expander to thereby push the cone expander and move the sleeve away from the foremost new pipe section;

a shell housing said jack and for mating the frontal jack with the foremost new pipe section, said shell and said cylindrical sleeve being telescopic with respect to each other; and a rear jack assembly including a stationary support against which said rear jack pushes, and a mating member engageable with a back portion of a rearmost new pipe section so that the rear jack can push the mating member and thereby push the new pipe sections forwardly.

26. The apparatus of claim 25, further including a finned member attached to a front portion of the cone expander for fracturing old pipe sections when the finned member is pushed into the old pipe sections.

27. The apparatus of claim 26, further including a snout attached to a front portion of the finned member to follow the path of the old pipe sections.

28. Apparatus for replacing old underground pipes, comprising:

a hydraulic jack;

a collar engageable with the hydraulic jack for engaging a rear-most section of a new pipe and for forcing the new pipe into a path of the old underground pipe;

frontal apparatus engageable with a frontal section of the new pipe so as to be pushed forwardly when the new pipe section is forced forwardly by the hydraulic jack, said frontal apparatus including a frontal hydraulic jack and a cone expander element for breaking up the old pipe and expanding radially outwardly the old pipe to form a bore for movement therein of the new pipe when the frontal apparatus is pushed forwardly; and a bladder connected to the frontal hydraulic jack for allowing a fluid exchange between the hydraulic jack and the bladder during operation of the frontal hydraulic jack.

* * * * *

UNITED STATES PATENT AND TRADEMARK OFFICE
CERTIFICATE OF CORRECTION

PATENT NO. : 5,482,404
DATED : January 9, 1996
INVENTOR(S) : Albert A. Tenbusch, II It is certified that error appears in the above-indentified patent and that said Letters Patent is hereby corrected as shown below:

Column 15, line 31, after "edge", insert --thereof--.

Column 16, line 4, delete "cylinder", insert --jack--.

Column 16, line 4, delete "interface with", insert
--interfere with the--.

Signed and Sealed this

Twenty-first Day of October 1997

BRUCE LEHMAN

Attest:

Attesting Officer

Commissioner of Patents and Trademarks